July 27, 1965 L. G. LEWIS 3,197,627

ELECTRONIC FUNCTION GENERATOR

Filed Nov. 8, 1961 3 Sheets-Sheet 1

July 27, 1965

L. G. LEWIS 3,197,627

ELECTRONIC FUNCTION GENERATOR

Filed Nov. 8, 1961

3 Sheets-Sheet 2

July 27, 1965 L. G. LEWIS 3,197,627

ELECTRONIC FUNCTION GENERATOR

Filed Nov. 8, 1961

3 Sheets-Sheet 3

United States Patent Office 3,197,627
Patented July 27, 1965

3,197,627
ELECTRONIC FUNCTION GENERATOR
Lloyd G. Lewis, La Grange, Ill., assignor to Electronic Associates Inc., Long Branch, N.J., a corporation of New Jersey
Filed Nov. 8, 1961, Ser. No. 151,093
4 Claims. (Cl. 235—197)

This invention relates generally to electronic function generators and more particularly to an electronic function generator for deriving an output signal which varies as a logarithmic function of an input signal.

In the electronic art generally and particularly in the art of analog computers, wide use is made of various non-linear function generators. The logarithmic function generator which produces an output signal which varies as a logarithmic function of an input signal finds its greatest usefulness to simulate physical phenomenon or, when operated in conjunction with other circuit components, to perform a required mathematical operation, such as four quadrant analog multiplication. Probably the most common form of logarithmic function generator comprises a plurality of diode shaping networks biased to conduct at various different amplitudes of potential and arranged to draw current so as to cause the output voltage to approximate a desired logarithmic function. Although this technique of generating logarithmic functions has relatively wide acceptance and can produce approximating functions of acceptable accuracy, its usefulness is limited to atmospheres of relatively constant temperature because of the temperature sensitivity of semiconductor diode elements.

The present invention utilizes the inherent temperature sensitivity of semiconductor diode elements for purposes of compensating the output of the function generator for variations in ambient temperature to render the accuracy of the function generator relatively insensitive to varying temperature conditions. In brief, the function generator according to the present invention may comprise a plurality of segment generators which are adapted to be connected in parallel and produce a combined output signal which will approximate the logarithmic function of an input signal. Each segment generator preferably includes a pair of diodes which are connected in a series-opposition relationship between an output terminal and an input terminal which is connected to a source of input potential. A source of reference potential is connected to the common juncture of the pair of diodes and biases one of the pair to a condition of conduction upon application of some predetermined minimum amplitude of input potential at the input terminal. The conducting condition of the one diode produces a potential at the junction of the pair of diodes which varies in amplitude with variations in the amplitude of the input signal to bias and control the conducting condition of the other diode of the pair. The current which is conducted by the other diode of the pair is summed with the output from the other segment generators and applied directly to the function generator output terminal. Means such as potentiometers may be associated with each segment generator to control its break-point, viz., amplitude of input signal at which the other diode of each pair will conduct, and slope, viz., amount of change in current which will be drawn or conducted by the other diode of each pair upon conduction of same for a given change in input signal.

With variations in ambient temperature, the biasing potential appearing at the common juncture of a pair of diodes will vary as a result of the inherent temperature sensitivity of the diode elements. With the diodes within each segment generator disposed in a series-opposition relationship, variation in biasing potential will be such as to maintain the current through the other diode of each pair substantially the same. Additional means such as negative and positive temperature coefficient resistors may be associated with the one of the diodes in each pair as well as with the common juncture of each diode pair to effect additional temperature compensation.

It is, therefore, an object of the present invention to render the accuracy of a logarithmic function generator relatively insensitive to ambient temperature variations.

Another object of the present invention is to generate logarithmic functions with an accuracy dependent primarily only on the precision of input voltages and resistor components and free from diode thermal drift.

A further object is to provide independent and non-interfering adjustments of parallax, break-point and slope for a logarithmic function generator.

Still another object of the present invention is to generate logarithmic functions with the same degree of accuracy throughout the range of input signal variations.

Other objects, features, and advantages will become apparent from the following description taken in connection with the accompanying drawings wherein.

Figure 1:
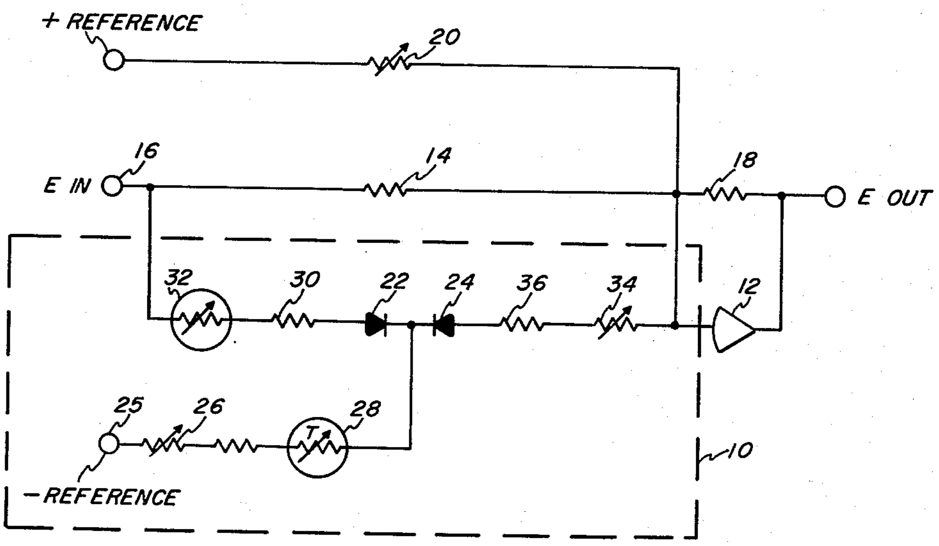
FIG. 1 is a diagram of a two segment generator according to the present invention.

A single segment generator 10, according to the present invention, is shown in FIG. 1 to be operated in conjunction with a conventional operational amplifier 12 which has an input resistor 14 connected between the amplifier input terminal and an input terminal 16 and a feedback resistor 18 connected in shunt to the amplifier between its input and output terminals. A source of positive reference potential is delivered to the amplifier input terminal via an adjustable resistor 20 which serves to adjust the parallax or full scale condition of the function generator. An input signal, which in the present embodiment may be of a positive polarity, is applied to the terminal 16. The ratio of resistors 14, 18 determines the initial slope of the output signal from amplifier 12. With positive input signals applied to amplifier 12, the output therefrom is negative or of an opposite polarity. An additional operational amplifier, not shown, or an additional stage of amplification, not shown, may be connected to the output terminal of amplifier 12 to achieve polarity inversion of its output signals. In the present description, for convenience of explanation, it will be presumed that the output from amplifier 12 will be of the same polarity as its input signals.

The single segment generator 10 comprises a diode element 22 which functions in the manner of a non-linear impedance element and a diode element 24 which functions in the manner of a switch for connecting additional resistance in shunt to the resistor 14. As shown in FIG. 1, the diodes 22, 24 are connected in a series-opposition relationship between the input terminal 16 and the amplifier input terminal. As used herein, a series-opposition relationship shall means that the diodes have a common cathode or common anode connection as determined by the polarity of the input signal. A reference potential source, which in the present embodiment is shown to be negative, is connected to a terminal 25 and applied therefrom to the common juncture of the diodes via the two variable resistors 26 and 28. A fixed value resistor 30 and a thermally sensitive resistor 32 may be disposed in a series-circuit relationship between the anode of diode 22 and the input terminal 16. A variable value resistor 34 and a fixed value resistor 36 are connected in series therewith from a connection between the anode of diode 24 and the input terminal of amplifier 12.

With the negative reference source biasing diodes 22 and 24 in a forward conducting direction, the diodes 22 will conduct immediately upon application of some predetermined minimum amplitude of positive input potential, such as 0.1 volt, at the terminal 16. The resistors 26, 28, the resistor 30, 32 and the internal resistance of the diode 22 function in the manner of a voltage divider network with respect to the potential difference appearing across terminals 16, 26 to produce a varying predetermined amplitude of potential at the common juncture of the diodes 22, 24 for all values of the variable input signal. Appropriate selection of the values of the resistors comprising the two halves of the voltage divider network will cause diode 24 to conduct at a predetermined amplitude of the input signal and the amount of current which will flow or be conducted by the diode 24 will, in turn, be a function of the amplitude of voltage appearing at the juncture of the diodes and a function of the value of resistors 30, 32, 34, 36 and the internal or dynamic resistance of the diodes 22 and 24.

Figure 2:
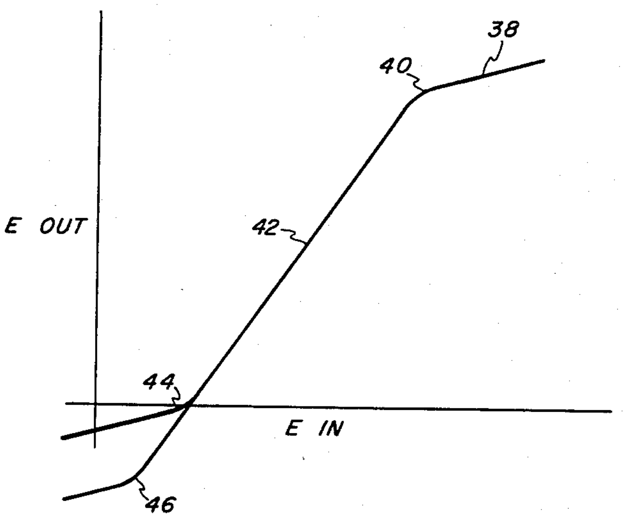
FIG. 2 is a graph illustrating the output characteristic of the logarithmic function generator according to FIG. 1.

In FIG. 2 the output signal, $e_{out}$, from the circuit of FIG. 1 is plotted with respect to the input signal $e_{in}$. The straight line portion 38 is obtained when diode 24 is not conducting and only resistor 14 provides a path for the input signal from terminal 16 to the amplifier input. The knee 40 of the curve results when diode 24 conducts and influences the current flow to the amplifier input. As the input voltage is gradually reduced in amplitude, the straight line segment 42 will result. Thereafter, when the input signal diminishes to some minimum amplitude as determined by the ratio of the two halves of the voltage divider network, the conducting condition of diode 24 cannot be maintained; the resistors 34 and 36 are disconnected from the common juncture of the diodes; and the slope of the output characteristic, FIG. 2, will revert to its prior slope 38. It was found that if the value of resistance connected between diode 24 and the amplifier is permitted to decay to zero, some rounding of the output characteristic at the lower knee would extend above the abscissa axis as indicated at 44. Since only positive output signals are presumed to be of importance in the present embodiment, viz., the present function generator operates only in one quadrant and produces output signals of only one polarity of slope, the occurrence of this lower knee caused some distortion of the output characteristic. This distortion was eliminated by the use of the fixed value resistor 36 connected in series with the diode 24 and resistor 34 to extend the slope 42 beneath the abscissa axis as shown at 46.

Since the break-point 40 in FIG. 2 is a function of the ratio of the two halves of the voltage divider network, its point of occurrence can be varied relative to the amplitude of the input signal by adjustment of this ratio through the use of the variable resistor 26. Similarly, since the slope 42 is a function of the current drawn or passed by the diode 24 for a particular change in amplitude of the input signal, adjustment of this characteristic may be obtained by adding or subtracting resistance in series with this diode through the use of the adjustable resistor element 34. These adjustments do not interfere with one another, nor with the parallax adjustment achieved by resistor 20.

Figure 3:
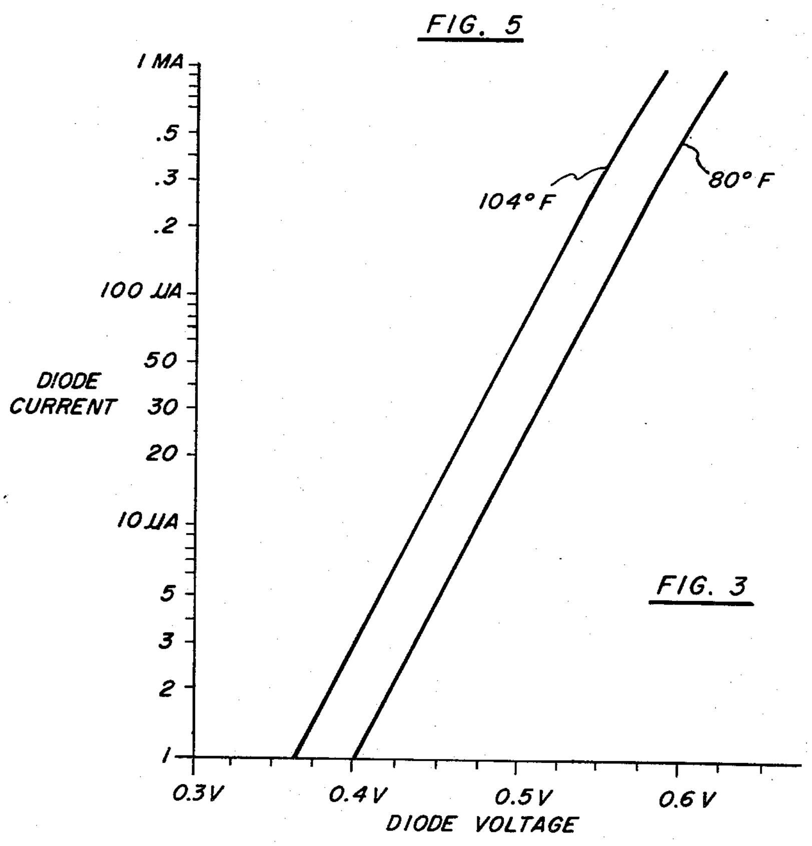
FIG. 3 is a graph useful in the understanding of the operation of the logarithmic function generator of FIG. 1.

Turning now to the ambient temperature compensating aspects of the present invention, reference is made to FIG. 3 wherein a typical voltage-current characteristic is shown in semi-logarithmic form for a typical diode element, such as 22 and 24. The slope of the two curves in FIG. 3 are considered to correspond to the dynamic resistance of the diodes and are shown at different temperatures, namely, 80° F. and 104° F. The value of resistance at any given point along the curves of FIG. 3 is considered to be the D.C. or static resistance of the diodes. The curves further are seen to be substantially straight lines throughtout their length. If an equivalent circuit for a typical diode is considered to comprise an equivalent battery in series with an equivalent resistor, from FIG. 3 it becomes apparent that an increase in temperature reduces the equivalent battery voltage while increasing the value of the equivalent resistor. The temperature effect on the equivalent battery dominates and for an increase in temperature the D.C. or static resistance of a diode is seen to decrease.

In connecting the two similar diodes 22 and 24 in series-opposition, the inherent temperature drift of each is utilized to reduce the overall effects of ambient temperature variations on the output signal produced by the present function generator. If, for example, the circuit of FIG. 1 is operated at 80° F. for some predetermined amplitude of input signal and one microampere of current flows through diode 24, from FIG. 3 the voltage drop across this diode is seen to be approximately 0.4 volt. If, then, the temperature is increased to 104° F. and a constant current flow through the diode is assumed, it is seen that the diode voltage drop will decrease to approximately 0.37 volt because of variations in its D.C. or static resistance. In order to achieve this constant flow of current through the diode 24, as is necessary to insure accuracy of function generator operation under varying ambient temperature conditions, the voltage at the junction of the diodes must increase in amplitude by 0.03 volt.

If it is presumed that the current passing through diode 24 is of the same amplitude as the current passing through diode 22, viz., same voltage drop across each diode, it should be apparent that a change in temperature will affect each diode in an identical manner; a 0.03 volt decrease in voltage drop across diode 22 will be accompanied by a 0.03 volt decrease in the voltage drop across diode 24. However, since the change in D.C. or static resistance of diode 24 affects the overall resistance of the voltage divider network as well as the resistance ratio of the two halves of the voltage divider network, the overall effect of this change is such that the voltage at the junction of the diodes does not increase by exactly 0.03 volt. Therefore, although the D.C. or static resistance change of diode 24 attempts to and in fact does cause and increase in voltage at the diode junction, its compensation is not complete.

The use of the thermally sensitive resistor 28, which has a positive temperature coefficient, aids in increasing the voltage at the diode junction to the appropriate amplitude. In this regard, resistor 28 is of such a value that the current passing through it remains susbtantially constant throughout an expected range of ambient temperature variations.

In addition, the ratio of the voltage divider network in the embodiment of FIG. 1 is such that significantly more current is normally passed by the diode 22 than is passed by the diode 24. Accordingly, there may be a more significant voltage drop across diode 22 than across the diode 24. A second thermally sensitive resistor 32, which has a negative temperature coefficient, is provided for purposes of additional compensation. Resistor 32 may be of such value that for a given temperature change its change in voltage drop is exactly equal to the difference between the changes in voltage drops across diodes 22 and 24.

With appropriate selection of resistor values an increase in ambient temperature in the embodiment of FIG. 1 will cause a decrease in the voltage drop across diode 24, a decrease in voltage drop across the voltage divider network section comprising the diode 22 and resistors 30 and 32, and an increase in voltage drop across the voltage divider network section comprising the resistors 26 and 28. These changes in voltage are selected to be of such magnitude that the newly established voltage at the junction of the diodes will exactly compensate for the variations in voltage drop across diode 24 and maintain a constant flow of current through the diode 24.

Figure 4:
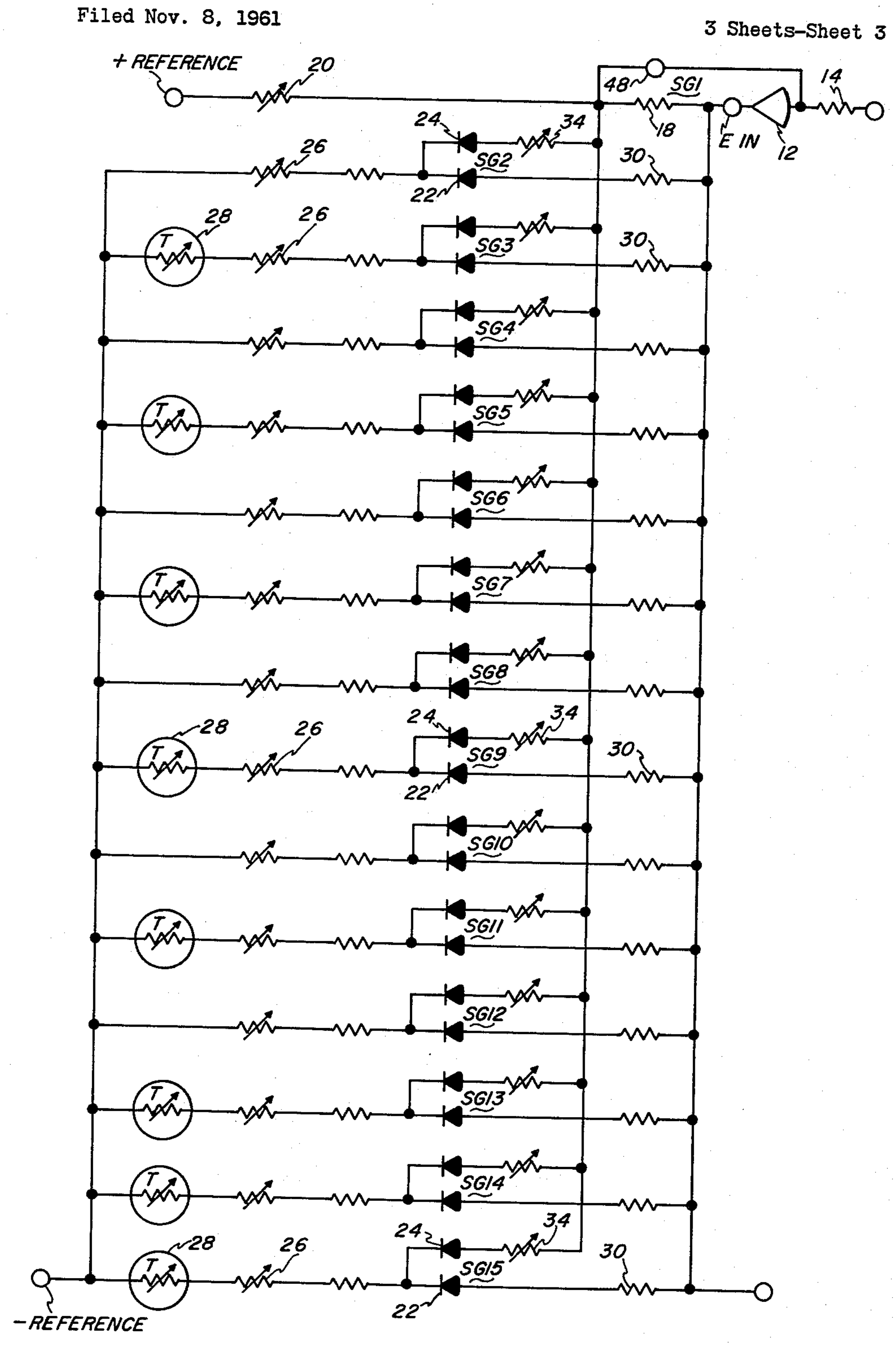
FIG. 4 is a diagram of a logarithmic function generator comprising a plurality of segment generators according to the present invention.

In the plural segment function generator of FIG. 4, similar reference numerals are used to designate similar parts. The plural function generators SG1 through SG15 are connected in the feedback network of amplifier 12 and contribute additional resistance in parallel with the fixed value feedback resistor 18. As thus connected, the circuit of FIG. 4 will generate an anti-logarithmic output function of the input signal which is applied to the input resistor 14. It was found that with the input signal varying from 0.15 to 10 volts, an accuracy of 0.2 percent was obtained over 5° F. of ambient temperature variation without the use of the thermally sensitive resistors 32. This was achieved because of the substantially parallel relationship of the curves of FIG. 2, viz., the dynamic resistance of the diodes is substantially a constant. Therefore the resistors 32 are not shown in FIG. 4. In addition, it was found that this accuracy of 0.2 percent was obtained without requiring the resistors 28 to be associated with all segment generators. Thermally sensitive resistors 28 are shown to be associated with every other of the first 12 segment generators in FIG. 4 and with the last three segment generators, SG13, SG14 and SG15. In addition, the fixed value resistor 36 was incorporated directly into the resistor 34.

Assuming that the voltage input to the function generator of FIG. 4 (output from amplifier 12) varies from 10.0 to 0.15 volts, the following Table I shows the summation current from the generator as it occurs at the function generator output terminal 48.

*Table I*

| $E_{in}$ (volts) | $I_{out}$ (milliamperes) |
|---|---|
| 10.00 | 2.00 |
| 8.50 | 1.93 |
| 7.00 | 1.84 |
| 5.50 | 1.74 |
| 4.50 | 1.64 |
| 3.50 | 1.55 |
| 2.75 | 1.44 |
| 2.15 | 1.34 |
| 1.70 | 1.22 |
| 1.25 | 1.09 |
| 0.90 | 0.96 |
| 0.63 | 0.80 |
| 0.41 | 0.60 |
| 0.24 | 0.36 |
| 0.15 | 0.18 |

Figure 5:
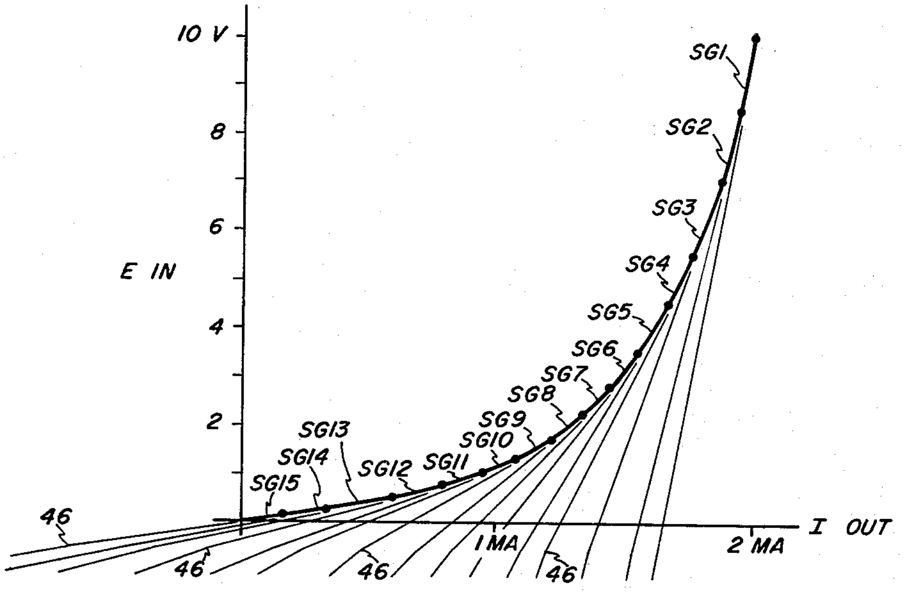
FIG. 5 is a graph illustrating the input-to-output characteristic of a logarithmic function generator according to FIG. 4.

The values shown in Table I are also shown graphically in FIG. 5 to illustrate the anti-logarithmic function which the circuit of FIG. 4 generates in response to the varying amplitude input signal. From Table I and from FIG. 5, it should be apparent that when the input voltage is at its maximum, viz., 10.00 volts, none of the diodes 24 will conduct; accordingly only the fixed amplitude resistor 18 is connected in shunt to the input and output terminals of amplifier 12. As the input signal diminishes in amplitude toward 0.15 volt, the diodes 24 will be switched on sequentially and contribute additional resistance in shunt to the resistor 18 and produce progressively less output current at the terminal 48. The individual segments of the curve of FIG. 5 are labeled with numerals corresponding to the individual segment generators of FIG. 4. The current contribution of each segment generator has been extended beneath the abscissa axis of FIG. 5 to illustrate the occurrence of the lower knee in each of the generated segments.

While the function generator according to the present invention has been illustrated and described for the generation of logarithmic functions, it should be apparent to those skilled in the art that its principle of operation could be utilized for purposes of deriving other forms of arbitrary functions which have one polarity of slope. Therefore, while a preferred embodiment of the invention has been disclosed, it is to be understood that many changes may be made therein and that the matter herein before set forth or shown in the accompanying drawings is to be interpreted as illustrative only and not in a limiting sense.

I claim:

1. Electronic function generating apparatus for providing an output potential which varies in accordance with the logarithmic function of the amplitude of an independent variable input potential which is delivered from a source, comprising in combination, a pair of diodes connected in a series-opposition relationship between the source of input potential and an output terminal, and a reference voltage source including a positive temperature coefficient resistor element coupled to the common juncture of said pair of diodes and biasing one of said pair of diodes to a condition of continuous conduction whereby, in dependence upon the amplitude of the input signal the other of said pair of diodes is biased to a condition of conduction, variations in the amplitude of the input potential causing corresponding variations in the amount of current which is conducted by each of said pair of diodes, and a negative coefficient resistor element connected in series circuit with said one of said diodes on the side thereof remote from common juncture, said negative temperature coefficient resistor having a value and a coefficient to provide with a change in temperature a change in voltage drop thereacross substantially equal to the difference between the changes in voltage drops across said first and second diode elements, whereby variations in ambient temperature affect only the amplitude of potential at the junction of said pair of diodes to maintain a constant flow of current through the one of said pair of diodes.

2. Electronic function generating apparatus for providing an output potential which varies in accordance with the logarithmic function of the amplitude of an independent variable input potential which is delivered from a source, comprising in combination, a voltage divider network including a series circuit arrangement of a first resistor having a linear negative temperature coefficient, a first diode element, and a second resistor having a linear positive temperature coefficient, a second diode element connected to the juncture of said first diode element and said positive temperature coefficient resistor for delivering an output current to an output terminal, said negative temperature coefficient resistor having a value and a coefficient to provide with a change in temperature a change in voltage drop thereacross substantially equal to the difference between the changes in voltage drops across said first and second diode elements, said voltage divider network having one end connected directly to the source of input potential and having another end connected to a source of reference potential whereby said diode is biased to continuously conduct and a biasing potential is produced at the juncture of said diode element and said positive temperature coefficient resistor which has an amplitude controlled only by the amplitude of the input potential, whereby the output current from said second diode element remains substantially constant with ambient temperature variations.

3. Electronic function generating apparatus according to claim 2 including a variable resistance element connected between said second diode element and the output terminal for controlling the amplitude of potential which is required at the juncture of said first diode element and said positive temperature coefficient resistor to cause said second diode element to conduct.

4. Electronic function generating apparatus according to claim 2 including an adjustable resistance element connected between the source of reference potential and said positive temperature coefficient resistor for controlling the resistance ratio of said voltage divider network and thereby the slope of the output current delivered by said second diode element with respect to the slope of the input potential.

References Cited by the Examiner

UNITED STATES PATENTS

| | | | |
|---|---|---|---|
| 2,899,550 | 8/59 | Meissinger | 235—197 |
| 2,976,430 | 3/61 | Sander | 235—197 X |

OTHER REFERENCES

De Sautels: "Temperature Compensation Method for Transistor Amplifiers," Electronic Design, Nov. 15, 1956.

MALCOLM A. MORRISON, *Primary Examiner.*

DARYL W. COOK, *Examiner.*